United States Patent [19]

Sansone et al.

[11] Patent Number: 5,084,203

[45] Date of Patent: Jan. 28, 1992

[54] LIGHT TRANSMISSIVE LIQUID CRYSTALLINE COMPOSITE EXHIBITING A HIGH KERR EFFECT

[75] Inventors: Michael J. Sansone, Berkeley Heights; Mark S. Kwiatek, Union City, both of N.J.

[73] Assignee: Hoechst Celanese Corp., Somerville, N.J.

[21] Appl. No.: 668,539

[22] Filed: Mar. 13, 1991

[51] Int. Cl.$^5$ .................. C09K 19/54; G02F 1/13
[52] U.S. Cl. ..................... 252/299.5; 252/299.01; 522/5; 522/2; 359/51; 359/103; 359/900
[58] Field of Search ............... 252/299.01, 299.5; 350/347 V, 350 S, 350 R; 522/5, 2

[56] References Cited

U.S. PATENT DOCUMENTS

| | | | |
|---|---|---|---|
| 4,671,618 | 6/1987 | Wu et al. .................. 350/347 V |
| 4,818,070 | 4/1989 | Gunjima et al. ................. 350/334 |
| 4,869,847 | 9/1989 | Leslie et al. ................. 252/299.01 |
| 4,888,126 | 12/1989 | Mullen et al. ................. 252/299.5 |
| 4,891,152 | 1/1990 | Miller et al. ................. 252/299.01 |
| 4,938,568 | 7/1990 | Margerum et al. ................. 350/334 |
| 4,944,576 | 7/1990 | Lacker et al. ................. 350/334 |
| 4,971,719 | 11/1990 | Vaz et al. ................. 252/299.5 |
| 5,011,624 | 4/1991 | Yamagishi et al. ................. 252/299.5 |
| 5,021,188 | 6/1991 | Vaz et al. ................. 252/299.5 |

Primary Examiner—Robert L. Stoll
Assistant Examiner—Richard Treanor
Attorney, Agent, or Firm—DePaoli & O'Brien

[57] ABSTRACT

In one embodiment this invention provides an optical medium which consists of a microdispersion of liquid crystal droplets in a synthetic resin matrix. A preferred invention optical medium exhibits a Kerr effect, and can transmit propagating light waves with low scattering loss under waveguiding conditions.

9 Claims, No Drawings ized monomer or curable
LIGHT TRANSMISSIVE LIQUID CRYSTALLINE COMPOSITE EXHIBITING A HIGH KERR EFFECT This invention was made with Government support under Contract No. F33615-85-C-5025 awarded by the Department of Defense (DOD). The Government has certain rights in this invention.

BACKGROUND OF THE INVENTION

A synthetic resin matrix containing a liquid crystal dispersion phase is a known type of organic composite. U.S. Pat. Nos. 3,935,337; 4,673,255; 4,671,618; 4,685,771; 4,688,900; 4,728,547; and 4,891,152 described microdisperse polymer/liquid crystal composites which scatter visible light and are adapted for utility in display devices.

Of particular interest with respect to the present invention are liquid crystal microdispersion media which are characterized by a low level of light scattering, and exhibit a Kerr effect under light transmitting conditions. U.S. Pat. No. 4,869,847 describes a composite of liquid crystal droplets having a diameter of no more than 0.1 micron dispersed in a synthetic resin matrix, and exhibiting a Kerr effect.

There is continuing interest in the development of liquid crystalline materials which exhibit a novel combination of properties for efficient light modulation applications.

Accordingly, it is an object of this invention to provide a process for the production of microdispersion liquid crystalline composites.

It is a further object of this invention to provide liquid crystalline composites which are light transmissive and exhibit a high Kerr constant.

Other objects and advantages of the present invention shall become apparent from the accompanying description and examples.

DESCRIPTION OF THE INVENTION

One or more objects of the present invention are accomplished by the provision of a process for producing an optical medium exhibiting a Kerr effect which comprises (1) forming a homogeneous solution of between about 15-35 weight percent of liquid crystal in a polymerizable or curable organic phase; and (2) treating the organic phase with laser radiation at a temperature between about $-10°$ C. and $15°$ C. to provide a light transmissive solid matrix containing a dispersion of liquid crystal droplets; wherein the droplets are spherical in shape, and have a mean diameter in the range between about 30-70 nm and a coefficient of variance (mean/standard deviation) of about 0.2-0.4.

In a further embodiment this invention provides an optical medium having a Kerr constant of at least about $7 \times 10^{-12}$ m/V$^2$ at $25°$ C. and $99+$ percent wave transmission at 390-1500 nm, said optical medium comprising a solid polymeric matrix containing a dispersion of liquid crystal droplets; wherein the droplets are spherical in shape, and have a mean diameter between about 30-70 nm and a coefficient of variance (mean/standard deviation) of about 0.2-0.4. An optical medium preferably is a thin film with a thickness of less than about 30 microns.

A present invention optical medium can exhibit a Kerr constant which is more than 5000 times the Kerr constant of liquid carbon disulfide, such as between about $7 \times 10^{-12}$ and $7 \times 10^{-10}$ m/V$^2$ at $25°$ C.

The liquid crystal component of an invention composite can be any of the smectic, nematic and cholesteric compounds, either singly or in admixture, that are listed in publications such as U.S. Pat. No. 3,935,337 and U.S. Pat. No. 4,869,847. The preferred compounds are nematic liquid crystals which include alkyl and alkoxy biphenyl and terphenyls, alkyl benzoate cyanophenyls and cyanophenyl pyrimidines, such as p-cyanophenyl-p-n-alkylbenzoate, 5-n-alkyl-2-(4-cyanophenyl)pyrimidine, 4-cyano-4'-n-pentylbiphenyl, 4-cyano-4'-octyloxybiphenyl, and the like.

The polymeric component of an invention composite is derived from a polymerizable monomer or curable prepolymer which can be converted into a solid matrix by exposure to high intensity laser radiation. Suitable polymerizable or curable starting materials are listed in publications such as U.S. Pat. Nos. 3,935,337 and 4,728,547.

Illustrative of matrix thermoplastic polymers are polystyrene; polychloroprene; poly(methyl methacrylate); poly(vinyl acetate); poly(vinyl chloride); poly(ethylene terephthalate); polyacrylamide; and the like.

Illustrative of thermoset polymers are phenol-formaldehyde resins; urea-formaldehyde resins; epoxy resins; polyurethanes; unsaturated polyesters; cross-linked acrylate resins; and the like.

A present invention optical medium can be prepared by forming a solution of a liquid crystal and a selected polymerizable monomer or curable prepolymer, and forming a film by spinning or spraying the solution on a supporting substrate (e.g., glass or silicon).

If a vinyl monomer or mixture of vinyl monomers are employed as the polymer precursor, a polymerization initiator such as azobisisobutyronitrile can be incorporated in the polymerizable medium. If a curable prepolymer is employed as the polymer precursor, a radiation-sensitive initiator such as benzophenone can be incorporated in the curable medium.

The polymerization or curing cycle is accomplished by exposing a precursor thin film to high intensity radiation from an ultraviolet/visible range laser for a period between 0.1-2 minutes. A suitable radiation source is an argon laser with a 25 watt multi-line visible light output power and a 5 watt multi-line ultraviolet light output power.

The polymerization or curing time is dependent on the radiation intensity, the film thickness, and the particular polymer precursor employed.

A typical thin film has a thickness of about 0.5-5 microns, and can be in the form of a slab or channel waveguide for purposes of light modulation. A present invention composite thin film can be utilized as the waveguiding component in an electrooptic device for light intensity modulation as described in U.S. Pat. No. 4,767,169.

A present composite thin film has a unique combination of optical properties, which is mainly attributable to the size and shape of the liquid crystal droplets in the microdispersed phase. The droplets have a spherical shape, and have a mean diameter in the range between about 30-70 nm, and a coefficient of variance (mean/standard deviation) of about 0.2-0.4. The novel combination of microdispersion liquid crystal droplet size and uniformity allow $99+$ percent light transmission, while contributing a high Kerr effect to a waveguiding thin film.

The critical aspects of the microdispersion liquid crystal droplett physical dimensions are achieved by control of essential processing conditions during production of a composite composition.

First, the liquid crystal constituent is employed in a quantity not greater than about 25 weight percent. If a larger quantity of liquid crystal is used, the formed droplets tend to coalesce, and an increased droplet mean diameter is obtained.

Second, high intensity laser radiation is utilized to polymerize or cure the polymer precursor to a solid matrix within a relatively short period between about 0.1-2 minutes. A rapid polymerization or curing cycle favors small liquid crystal droplet size formation.

Third, the liquid crystal microdispersion formation cycle is conducted at a temperature between about $-10°$ C. and $15°$ C. This is a particularly critical feature of the process for composite production, since the use of a temperature above about $15°$ C. results in a liquid crystal microdispersion with a larger droplet mean diameter. At a temperature between about $-10°$ C. and $15°$ C., the viscosity of the polymer precursor solution is higher, and coalescing of nascent liquid crystal droplets is minimized.

The following examples are further illustrative of the present invention. The components and specific ingredients are presented as being typical, and various modifications can be derived in view of the foregoing disclosure within the scope of the invention.

EXAMPLE I

Thin film samples are prepared by spin coating the solutions on microscope slides, and exposing the samples respectively to different radiation sources at different temperatures. The thin films have a thickness of about one micron.

The solutions are prepared by admixing E-7 nematic liquid crystal (EM Industries, Hawthorne, NY) which consists of 15% by weight 4-cyano-4'-n-pentylbiphenyl, 21% 4-cyano-4'-n-heptylbiphenyl, 16% 4-cyano-4'-octyloxybiphenyl and 12% 4-cyano-p-4'-pentylterphenyl, with Norland 60 epoxy resin (Norland Products, New Brunswick, NJ) which contains Daocure 1173 photoinitiator (EM Industries).

Mercury arc and laser radiation sources are employed. The laser cured samples are exposed to multiline ultraviolet radiation from an argon ion laser at an intensity of 1850 mW/cm$^2$ for 30 seconds.

The mean diameter (number average), standard deviation, and coefficient of variance of the microdispersion liquid crystal droplets are measured, using the equipment and procedures described in U.S. Pat. No. 4,869,847. The comparative data are summarized in Table I.

TABLE I

| Sample | Diameter (nm) | Std. Dev. (nm) | C.V. | Shape |
|---|---|---|---|---|
| 20% E7/N60 Hg arc at RT | 48 | 16 | 0.333 | irregular |
| 25% E7/N60 Hg arc at RT | 66 | 20 | 0.303 | irregular |
| 30% E7/N60 Hg arc at RT | 97 | 24 | 0.247 | irregular |
| 33% E7/N60 Hg arc at RT | 160 | 51 | 0.319 | irregular |
| 20% E7/N60 RT laser cure | 38 | 14 | 0.368 | spherical |
| 25% E7/N60 RT laser cure | 49 | 15 | 0.306 | round & elongated |
| 30% E7/N60 RT laser cure | 165 | 45 | 0.273 | spherical |
| 33% E7/N60 RT laser cure | 127 | 65 | 0.512 | irregular |
| 20% E7/N60 5° C. laser cure | 33 | 7 | 0.212 | spherical |
| 25% E7/N60 5° C. laser cure | 42 | 16 | 0.381 | spherical |
| 30% E7/N60 5° C. laser cure | 70 | 20 | 0.286 | spherical |

The data demonstrate that a sample which has a 20% by weight content of liquid crystal and is laser cured at 5° C., has a dispersion of droplets with the smallest diameter, standard deviation and coefficient of variance, and the most uniform shape.

Following the same procedure as described above, a solution is prepared by admixing 3.3 g of E-7 nematic liquid crystal, 12.5 g of ethyl acrylate, 0.4 g of propane:-trimethanol triacrylate, and 0.3 g of Daocure 1173 photoinitiator.

Thin film samples are prepared, and the physical properties of the thin film microdispersed liquid crystal phase are equivalent to those for the corresponding composites listed in Table I.

EXAMPLE II

Thin film composite samples are prepared using the materials and procedures described in Example I. An argon laser is used for curing (2 watts/cm$^2$, 30 seconds) the thin films.

The relative Kerr constant is determined by application of a DC field to a thin film composite sample, and the degree of light transmission at 550 nm is measured. Comparative data are summarized in Table II.

TABLE II

| % LC | rel. Kerr constant | curing temp. | transmission at 550 nm | wavelength for 99% T |
|---|---|---|---|---|
| 20 | 909 | 10° C. | ≈100% | 390 nm |
| 20 | 742 | 5° C. | ≈100% | 390 nm |
| 20 | 554 | 0° C. | ≈100% | 390 nm |
| 20 | 636 | −5° C. | ≈100% | 390 nm |
| 20 | 606 | −10° C. | 94.1% | not reached |
| 25 | 1552 | 10° C. | 98.1% | 630 nm |
| 25 | 1776 | 5° C. | 98.1% | 630 nm |
| 25 | 1714 | 0° C. | 99.1% | 540 nm |
| 25 | 9257 | −5° C. | 87.9% | not reached |
| 30 | 4865 | 10° C. | 87.3% | 870 nm |
| 30 | 2661 | 5° C. | 86.3% | 900 nm |
| 30 | 5358 | 0° C. | 85.2% | 1290 nm |
| 30 | 94574 | −5° C. | 74.4% | not reached |

EXAMPLE III

Liquid crystal composites are prepared using visible light curing resins from ICI (LCR 000) and from Epolin (Ep 310001). The solutions are prepared by mixing the prepolymers with 20-40 percent E7 nematic liquid crystal. The 488 nm line of the argon ion laser is used for curing the material at an intensity of at least 2000 W/cm$^2$. Composites with activities comparable to those reported above are achieved but at higher liquid crystal loadings.

What is claimed is:

1. A process for producing an optical medium exhibiting a Kerr effect which comprises (1) forming a homogeneous solution of between about 15-35 weight percent of liquid crystal in a polymerizable or curable organic phase; and (2) treating the organic phase with laser radiation at a temperature between about $-10°$ C. and 15° C. to provide a light transmissive solid matrix containing a dispersion of liquid crystal droplets; wherein the droplets are spherical in shape, and have a mean diameter in the range between about 30-70 nm and a coefficient of variance (standard deviation means) of about 0.2-0.4.

2. A process in accordance with claim 1 wherein the optical medium exhibits a Kerr constant of between about $7 \times 10^{-12}$ and $7 \times 10^{-10}$ m/V$^2$.

3. A process in accordance with claim 1 wherein the solid matrix is a thermoset polymer.

4. A process in accordance with claim 1 wherein the solid matrix is an epoxy resin.

5. A process in accordance with claim 1 wherein the solid matrix is a thermoplastic polymer.

6. A process in accordance with claim 1 wherein the solid matrix is a polyvinyl polymer.

7. A process in accordance with claim 1 wherein the liquid crystal is a nematic liquid crystal.

8. A process in accordance with claim 1 wherein the liquid crystal is a cyanobiphenyl type liquid crystal.

9. A process in accordance with claim 1 wherein the step(2) radiation treatment is with an ultraviolet laser for an exposure period between about 0.1-2 minutes.

* * * * *